US012280722B2

(12) United States Patent
Buhr et al.

(10) Patent No.: US 12,280,722 B2
(45) Date of Patent: Apr. 22, 2025

(54) INTERIOR TRIM FOR A MOTOR VEHICLE, COMPRISING A HEADLINER AND A STIFFENING FRAME AND METHOD FOR THEIR MANUFACTURE

(71) Applicant: International Automotive Components Group GmbH, Duesseldorf (DE)

(72) Inventors: Patrick Buhr, Grafing (DE); Michael Behnke, Vaterstetten (DE)

(73) Assignee: International Automotive Components Group North America, Inc., Southfield, MI (US)

(*) Notice: Subject to any disclaimer, the term of this patent is extended or adjusted under 35 U.S.C. 154(b) by 404 days.

(21) Appl. No.: 17/214,301

(22) Filed: Mar. 26, 2021

(65) Prior Publication Data
US 2023/0039993 A1  Feb. 9, 2023

(30) Foreign Application Priority Data

Mar. 30, 2020  (DE) .......................... 102020108728.4

(51) Int. Cl.
*B60R 13/02*  (2006.01)
*B29C 70/00*  (2006.01)
(Continued)

(52) U.S. Cl.
CPC ........ *B60R 13/0231* (2013.01); *B29C 70/003* (2021.05); *B29C 70/081* (2013.01);
(Continued)

(58) Field of Classification Search
CPC ... B60R 13/0231; B60R 13/0218; B32B 7/09; B32B 5/275; B32B 5/028;
(Continued)

(56) References Cited

U.S. PATENT DOCUMENTS 7,147,276 B2    12/2006  Pfeffer et al.
7,942,475 B2 *   5/2011  Murray ................ B62D 29/001
                                                     296/210

(Continued)

FOREIGN PATENT DOCUMENTS

DE          19534627 A1 *  3/1997  ........... B29C 70/083
DE          20313770 U1     1/2005
(Continued)

OTHER PUBLICATIONS

English translation of WO03087466A1 (Year: 2003).*
DE-19534627-A1 (Year: 1997).*

*Primary Examiner* — Lori Lyjak
(74) *Attorney, Agent, or Firm* — Grossman, Tucker, Perreault & PFleger, PLLC; Steven J. Grossman

(57) ABSTRACT

The disclosure provides an interior trim part for a motor vehicle having a sliding or panoramic roof comprising a headliner and a stiffening frame attached to the headliner and enclosing and stabilizing an opening in the headliner enclosing the sliding or panoramic window, the stiffening frame being made of a fiber-reinforced composite material comprising a fiber mat and a textile lattice material, the textile lattice material being applied over a surface of the fiber mat and impregnated together therewith.

22 Claims, 4 Drawing Sheets

(51) Int. Cl.
*B29C 70/08* (2006.01)
*B29C 70/34* (2006.01)
*B29L 9/00* (2006.01)
*B29L 31/30* (2006.01)
*B32B 5/02* (2006.01)
*B32B 5/26* (2006.01)
*B32B 7/09* (2019.01)

(52) U.S. Cl.
CPC .............. *B29C 70/34* (2013.01); *B32B 5/028* (2013.01); *B32B 5/275* (2021.05); *B32B 7/09* (2019.01); *B60R 13/0218* (2013.01); *B29C 2791/002* (2013.01); *B29L 2009/00* (2013.01); *B29L 2031/3011* (2013.01); *B32B 2250/02* (2013.01); *B32B 2260/023* (2013.01); *B32B 2307/718* (2013.01); *B32B 2307/732* (2013.01); *B32B 2605/003* (2013.01)

(58) Field of Classification Search
CPC ........ B32B 2605/003; B32B 2307/732; B32B 2260/023; B32B 2250/02; B32B 2307/718; B32B 13/0218; B29L 2031/3011; B29L 2009/00; B29C 2791/002; B29C 70/34; B29C 70/003; B29C 70/081
See application file for complete search history.

(56) References Cited

U.S. PATENT DOCUMENTS 9,114,761 B2 8/2015 Schweindl et al.
2013/0334843 A1* 12/2013 Schweindl .......... B60R 13/0225
296/214

FOREIGN PATENT DOCUMENTS

| DE | 102007029468 A1 | * | 1/2009 | ........... B29C 70/088 |
| DE | 102012104534 A1 | | 11/2013 | |
| EP | 0591963 A1 | * | 4/1994 | |
| EP | 2666672 A1 | * | 11/2013 | ......... B60R 13/0225 |
| JP | 2002038655 A | * | 2/2002 | |
| KR | 20170083180 A | * | 7/2017 | ......... B60R 13/0212 |
| WO | WO-03087466 A1 | * | 10/2003 | ............ D06M 17/04 |

* cited by examiner

A-A

INTERIOR TRIM FOR A MOTOR VEHICLE, COMPRISING A HEADLINER AND A STIFFENING FRAME AND METHOD FOR THEIR MANUFACTURE

BACKGROUND

The disclosure relates to an interior trim part for a motor vehicle having a sliding or panoramic roof, comprising a headliner or a stiffening frame. The stiffening frame is attached to the headliner to enclose and stabilize an opening in the headliner that serves to receive the sliding or panoramic window. The headliner can be designed as a so-called lightweight headliner. Such lightweight headliners have, for example, a PU foam as their basic body and have a low weight per unit area in the order of 500 to 1000 g/m$^2$, for example. As a rule, they do not have sufficient rigidity to provide a stable frame for a sliding or panoramic window. It is therefore generally known to stabilize headliners that accommodate a sliding or panoramic window with a stiffening frame.

DE 203 13 770 U1 describes a headliner for a motor vehicle consisting of a relatively dimensionally stable core layer and a decorative layer facing the vehicle interior, which has an opening to accommodate a sliding roof. A reinforcing profile extends along the edge of the opening, the core layer and decorative layer being bent over to form the edge and the reinforcing profile being embedded in the bent-over edge. The reinforcing profile is made of plastic or metal.

DE 10 2012 104 534 A1 describes a stiffening frame for the roof opening of a motor vehicle made of a composite material, which is attached to the headliner and encloses and stabilizes an opening in the headliner.

The disclosure provides an interior trim part for a motor vehicle, in particular a headliner, and a method for its manufacture, wherein the headliner has an opening for receiving a sliding or panoramic window, which opening is enclosed and stabilized by a stiffening frame made of a composite material and has a higher energy absorption capacity than the prior art.

SUMMARY

The disclosure proposes an interior trim part for a motor vehicle having a sliding or panoramic roof comprising a headliner and a stiffening frame attached to the headliner. The stiffening frame has the function of enclosing and stabilizing an opening in the headliner that delimits the sliding or panoramic window. The stiffening frame is made of a fiber-reinforced composite material comprising a fiber mat and a textile lattice or grid material, the textile lattice material being applied flat to and impregnated together with a surface of the fiber mat. The disclosure provides a headliner, including its stiffener, that can be made entirely based on lightweight materials, such as foam materials and fiber materials. The composite of fiber mat and textile lattice material can significantly increase the energy absorption capacity of the reinforcing frame without significantly increasing its weight per unit area.

The textile lattice material is bonded to the fiber mat before impregnation. The bond can be a mechanical, thermal and/or chemical bond, for example by needling, spunlace or thermobonding.

The reinforcing frame can be manufactured without significant additional effort compared to the frame without lattice material because the fiber mat and lattice material are impregnated together, so no additional impregnation step is needed for the lattice material. In some embodiments, it is even possible to bond or consolidate the fiber mat in itself only when it is bonded to the lattice material, so that two bonding or consolidation processes are not required. The lattice material increases the area weight of the stiffening frame only insignificantly, for example on the order of 10% to 20%, while resulting in significantly improved energy absorption.

The composite of headliner and stiffening frame can achieve an energy absorption capacity that meets the requirements for absorbing a head impact in accordance with the FMVSS201 standard (Official designation: "Code of Federal Regulations (CFR); Title 49 (Transportation), § 571.201 (Standard No. 201; Occupant protection in interior impact)" or in short: "49 CFR § 571.201—Standard No. 201; Occupant protection in interior impact"). This can be tested, for example, by a head impact simulation using a head impact pendulum, whereby the following parameters are used in accordance with the standard: Ball diameter 165 mm; pendulum mass 6.8 kg; pendulum length 795.5 mm; center of rotation in z-direction from impact point; impact velocity 24.1 km/h or 19.3 km/h. This results in HIC values (HIC—Head Injury Criteria) for the disclosed inner liner that are significantly below the permissible thresholds. The details of the measurement procedure and the relevant threshold values are described in the FMVSS201U Standard.

In one example, the headliner may be constructed in multiple layers as a lightweight headliner, for example with a PU foam core and a decorative layer, and have an area weight in the range of, for example, 500 to 1000 g/m$^2$ or less. The stiffening frame can have a weight per unit area of around 800 to 1800 g/m$^2$ while meeting the above Standard.

The textile lattice material may be formed from polymer fibers, glass fibers, carbon fibers, or natural fibers or mixtures of these fibers. When it includes natural fibers, these may comprise, for example, cotton, hemp, kenaf, flax, sisal, jute, wood, or mixtures thereof. When it includes polymer fibers, these may comprise, for example, polymer fiber material made of organic synthetic polymer fibers, in particular polyester, for example PET, PP, PA, carbon, glass aramid or Kevlar.

The fiber mat may also be formed of polymer fibers, glass fibers, carbon fibers, or natural fibers, or mixtures of these fibers, referring to the above examples of materials that are also applicable to the fiber mat.

According to the disclosure, the composite material consisting of fiber mat and lattice material is impregnated with a binder. This can be, for example, a thermosetting binder, in particular epoxy, acrylate, phenol, polyurethane or unsaturated polyester, which is applied to and/or incorporated into the fiber mat in liquid or powder form, or a thermoplastic binder, in particular a biopolymer, such as PLA, polyester or PA, which is incorporated into the fiber mat in the form of thermoplastic binding fibers. Furthermore, a thermoplastic acrylate can be used. The composite material of the stiffening frame may have a mixing ratio of fibers and binders of from about 60:40 to about 80:20, in particular from about 70:30 to 80:20. The above material combinations form a good compromise between the requirements for high stiffness, good processability and low coefficients of thermal expansion at very low component weight.

It is possible to manufacture parts of the inner lining largely on the basis of lightweight, renewable materials, such as natural fibers. In particular, for example, the fiber mat can be made of natural fibers and the lattice material can be made of natural fibers or synthetic fibers. The materials of the headliner and the stiffening frame can be adapted to each other in such a way that their chemical and physical properties are compatible and, for example, problems due to different thermal expansion coefficients do not arise.

A specific material combination of fiber mat and textile lattice material are natural fibers, e.g. jute, hemp, kenaf or flax, for the fiber mat and synthetic fibers, e.g. polyester, especially PET for the textile lattice material in combination with a thermosetting binder, e.g. thermosetting acrylate. In this combination, for example, a coefficient of thermal expansion is achieved that is similar to that of many lightweight headliners, for example made of PU foam, so that there is no thermal warping between the headliner and the stiffening frame. Compared to metal or plastic frames, the stiffening frame has a low weight per unit area and yet a high specific strength.

The textile lattice material may include meshes or a grid-like fabric with a round, elliptical, triangular, rectangular or other polygonal mesh geometry. It can be produced by various techniques, such as a warp knitting process, laying, weaving, knitting, knotting, braiding, or the like. In various examples, the mesh size is, for example, between 0.5 and 25 mm, particularly between 1 and 12 mm, or, for example, about 1 mm, 2 mm, 5 mm, 8 mm, 12 mm. The width of bridges between individual meshes may be, for example, from 0.5 to 5 mm, and may be, for example, in the range of about 0.5 mm, 0.8 mm, 1.2 mm, 1.5 mm, or 1.8 mm.

The textile lattice material can be made from a yarn consisting of several filaments. While yarns made from single fibers can also be considered, the use of yarns consisting of fiber bundles is advantageous because of the higher strength.

In various examples, the textile lattice material has an area weight of 30 to 500 $g/m^2$, for example, of about 100 $g/m^2$, 125 $g/m^2$, 175 $g/m^2$, 215 $g/m^2$, 250 $g/m^2$, or 300 $g/m^2$. Also, because of its small width, it thereby contributes only insignificantly to the total weight of the reinforcing frame, for example only 10% or 20%, although the contribution of the textile lattice material to the area weight of the entire reinforcing frame can also be as high as 50%. The inclusion of the textile lattice material can increase the energy absorption capacity of the composite material such that the requirements of a head impact test discussed above are met, even if they would not be met using the same fiber mat without textile lattice material.

In one example of the disclosure, the stiffening frame is manufactured by compression molding the fiber-reinforced composite material as a compact component. It may be composed of multiple frame portions that are fused together during press forming. As a result, the stiffening frame can be manufactured by simply cutting fiber mats to size, largely without waste. The material requirement is thus minimized, while the pressing of the individual frame portions nevertheless produces a stiffening frame that has high stability and inherent rigidity. To increase the rigidity of the frame, it can be formed with profiles, for example U-profiles.

In one example of the disclosure, the stiffening frame is assembled from four frame portions that form the four sides of the frame and are fused together at the corners of the stiffening frame. For this purpose, the edge portions of the stiffening frame are simply inserted into a pressing tool so that they overlap at the corners of the stiffening frame. During pressing, they are fused together by the binder contained in the fiber composite. It is not necessary to supply an additional binder or adhesive. The stiffening frame can be molded or bonded to the headliner.

The stiffening frame according to the disclosure can additionally have inserts, for example made of metal or the same composite material. Attachment parts, such as fastening elements, additional stiffening frames and support structures, can also be molded onto the stiffening frame. It is also possible to integrate or attach grab handles, consoles, lighting elements, airbag components, etc. to the stiffening frame. Corresponding connecting parts can be inserted directly into a mold during compression molding of the stiffening frame and also integrated. The stiffening frame can also be extended to stiffen further recesses in the headliner, for example cutouts for lighting, or to serve as a receptacle for add-on parts, for example consoles. Thus, the disclosure is also applicable to an interior trim part for a motor vehicle that is not limited to use in a headliner. The interior trim part includes an interior trim base body and a stiffening frame secured to the interior trim base body and at least partially enclosing and stabilizing the interior trim base body, the stiffening frame being made of a fiber-reinforced composite material comprising a fiber mat and a textile lattice material, the textile lattice material being applied flat to and impregnated together with a surface of the fiber mat. The principles described and claimed herein are also applicable to this inner lining member.

The disclosure also provides a method of manufacturing an interior lining of the type described above, comprising the following process steps: Providing a fiber mat; applying a textile lattice material to the fiber mat; impregnating the fiber mat and the textile lattice material in one process step; and fabricating the reinforcing frame from the impregnated composite of fiber mat and textile lattice material. The textile lattice material may be mechanically, thermally, and/or chemically bonded to the fiber mat prior to impregnation. For example, the textile lattice material can be needled to the fiber mat before impregnation.

The method may further comprise: cutting the impregnated composite of fiber mat and textile lattice material into frame portions; placing the frame portions in a press mold so that the frame portions overlap; press molding the frame portions to form the stiffening frame into a predetermined shape and fuse the frame portions together; and joining the stiffening frame to the headliner. In one example, four frame portions are provided to form the four sides of the frame and overlap at the corners of the stiffening frame. The thickness of the composite mat can range from 1 to 12 mm, for example, depending on the weight per unit area and the desired degree of compaction before deformation. It also depends on the absolute dimensions of the frame, the geometry, the size of the recess and the stiffness requirements. The individual frame portions are joined by a matrix bond after melting and subsequent curing or polymerization of the binder. In this process, they are fused together and thus joined by a material bond.

The composite material mat can be cut to size, for example, by punching, although subsequent trimming after the stiffening frame has been formed, for example by punching or waterjet cutting, is still possible. In the process according to the disclosure, heat can be applied to the workpiece before and/or during press forming. Heating of the composite mat can be done, for example, by contact heating, IR emitters, circulating air or by other means.

The stiffening frame can be attached to the already molded headliner using adhesive or molded on as an insert in the headliner molding process. It is possible to manufacture the stiffening frame separately first and then mold it onto the headliner.

Furthermore, the stiffening frame can be extended to stiffen additional recesses on the headliner or to serve as a receptacle for add-on parts. For this purpose, for example, additional strips of the composite material can be inserted into the forming tool and also molded on.

DESCRIPTION OF DRAWINGS

The disclosure is further illustrated below by way of examples with reference to the figures.

In the figures show.

DESCRIPTION OF EXAMPLES

Figure 1:
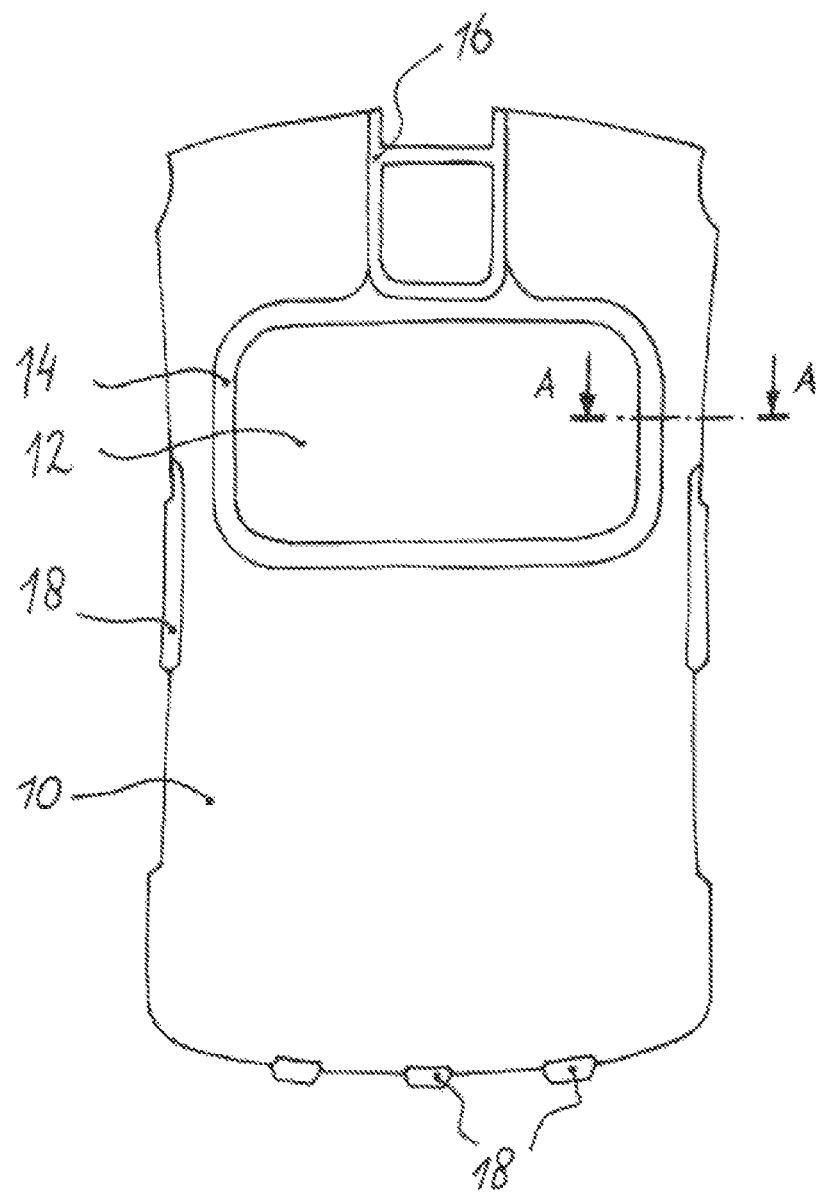
FIG. 1 a top view of an interior trim part for a motor vehicle having a headliner and a stiffening frame.

FIG. 1 shows a headliner 10 for a motor vehicle with an opening 12 which, when the headliner is installed, delimits a sliding or panoramic window. The opening 12 is enclosed and stabilized by a stiffening frame 14. An additional smaller stiffening frame 16 for a front console is molded onto the stiffening frame 14. FIG. 1 further shows fastening elements 18 for fastening the headliner 10 to the inside of a vehicle roof.

Figure 2:
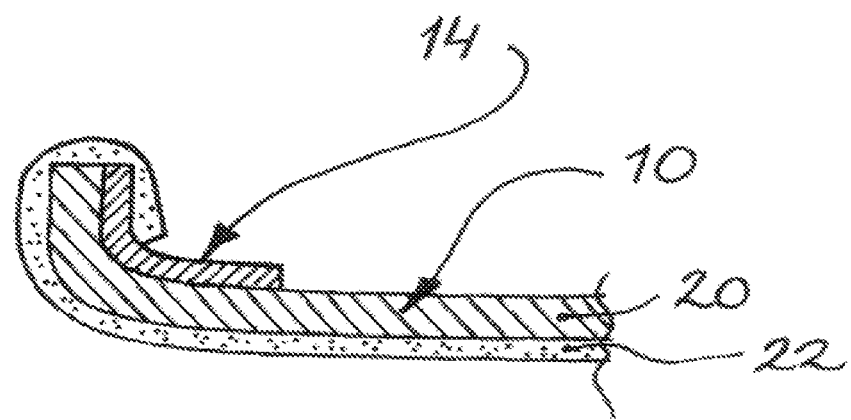
FIG. 2 a sectional view through part of the headliner with stiffening frame of FIG. 1 along line A-A.

The structure of the headliner 10 and the stiffening frame 14 is shown with further details in the sectional view of FIG. 2. The headliner 10 is constructed as a sandwich with a core layer 20 and a cover or decorative layer 22. The core layer 20 may be a foam layer, e.g., a PU foam layer, and the cover layer 22 may be, e.g., a textile layer, a nonwoven or leather, optionally with a haptic layer, foam, nonwoven or spacer fabric.

The headliner 10 is curved upward at its edges, which border the opening 12, and is reinforced by the stiffening frame 14. In the example shown, the cover layer 22 is placed around the edge of the core layer 10 and the stiffening frame 14 to form a neat finish. The stiffening frame 14 follows the contour of the headliner 10 and has, for example, a U- or L-profile. It lies flat against the headliner 10. Additional profiling can be provided to stiffen the stiffening frame.

Figure 5:
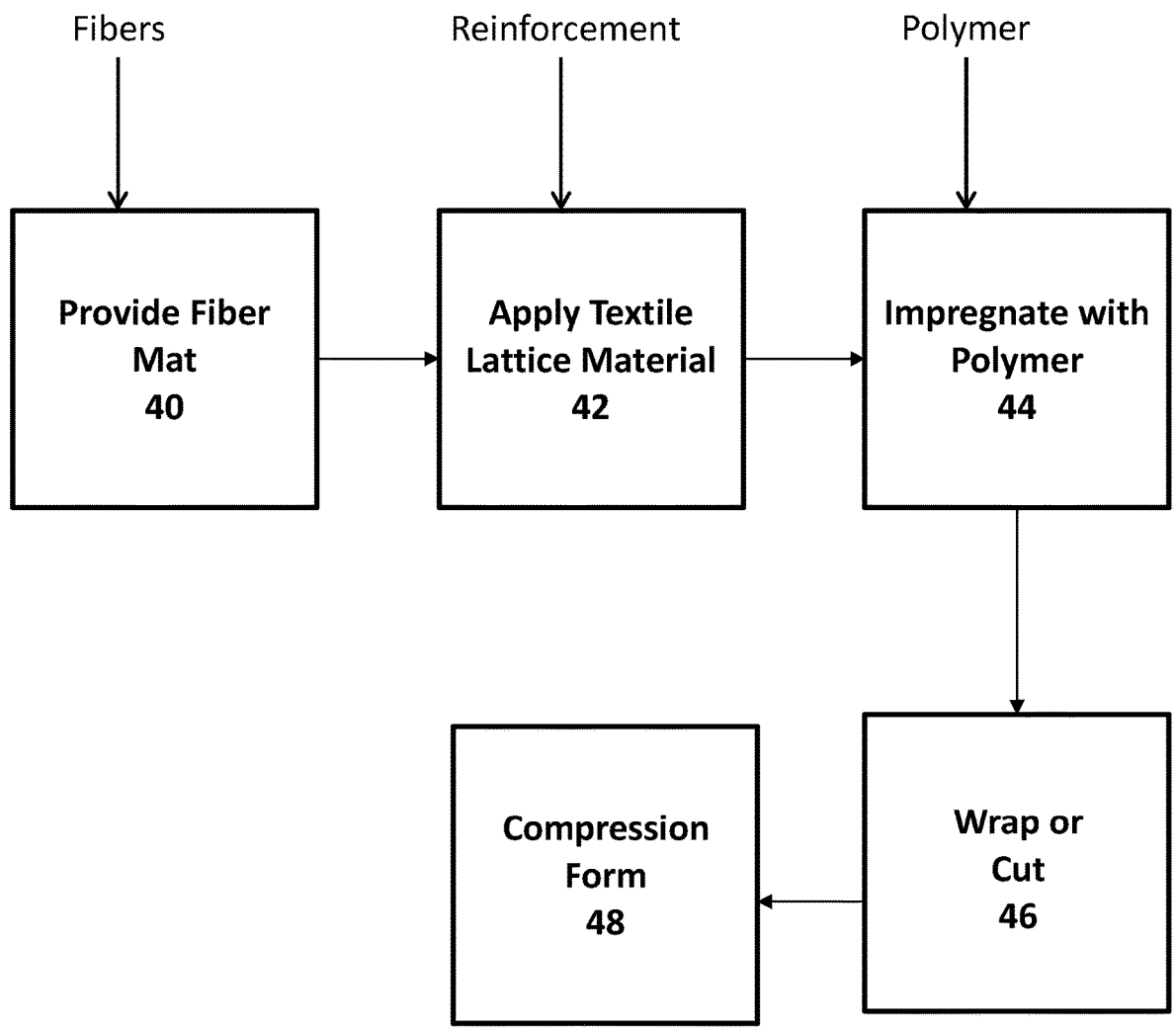
FIG. 5 a schematic flow diagram of a process for producing the composite material for the stiffening frame according to an example.

With regard to the materials for the stiffening frame 14, its manufacture and its connection to the headliner 10, reference is made to the above description and to FIG. 5 and its description.

Figure 3:
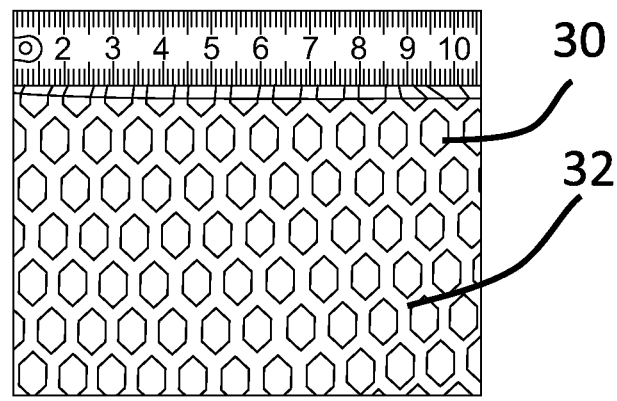
FIG. 3 a top view of a portion of a composite material used to make the stiffening frame according to an example.

FIG. 3 shows a top view of a portion of a composite material for manufacturing the stiffening frame. The composite material comprises, respectively, a fiber mat 30 and a textile lattice material 32 applied to the surface of the fiber mat 30. The fiber mat 30 is made of synthetic fibers, natural fibers or a fiber blend, which may be present in a loose composite or may be mechanically, thermally and/or chemically bonded in advance and optionally compacted. Reference is made to the materials mentioned above, for example. In the examples illustrated herein, the fiber mat 30 comprises natural fibers, for example, flax, jute, hemp or kenaf or blends of these fibers. In various examples, the fiber mat including its binder content may have a nominal area weight of 900-1600 g/m² and a thickness of about 2-10 mm in the uncompressed state or 0.8 mm-2 mm when compressed.

FIG. 3 shows an example of a composite of a bottom fiber mat 30 made of natural fibers and an overlying textile lattice material 32 made of PET, which in the example shown has approximately hexagonal meshes 34 with a mesh size of about 8 mm. In this example, the lattice material is produced by a warp knitting process. The bridge width between the meshes is 1 to 2 mm, in particular 1.2 to 1.7 mm, for example about 1.2 mm, 1.5 mm or 1.7 mm. The meshes have the shape of a polygon, in particular a hexagon. The area weight of the textile lattice material is about 100-300 g/m², e.g. about 120 g/m², 175 g/m², 250 g/m² or 300 g/m².

In another example, not shown in the figures, both the fiber mat 30 and the lattice material 32 may be made of natural fibers, for example flax fibers. The lattice material 32 may have, for example, rectangular meshes, particularly square meshes, with a mesh size of approximately 5-15 mm. The lattice material may be made by laying and joining natural fiber threads at the crossing points. The bridge width between the meshes may be, for example, 1 to 2 mm, in particular 1.2 to 1.7 mm, for example, about 1.2 mm, 1.5 mm or 1.7 mm. The area weight of the textile lattice material may be about 150-250 g/m², for example about 175 g/m² or 220 g/m².

Figure 4:
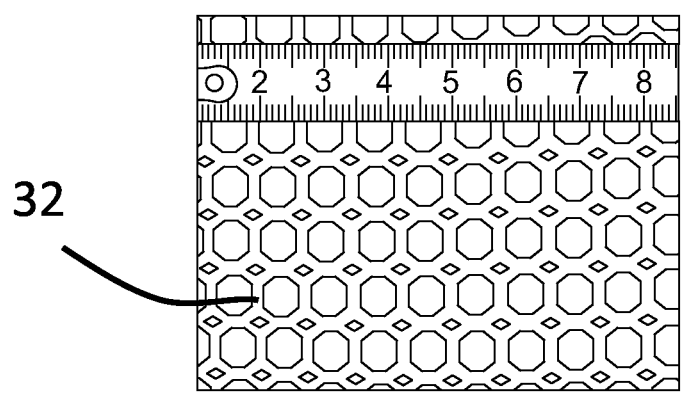
FIG. 4 a top view of a lattice material for manufacturing the stiffening frame according to another example.

FIG. 4 shows an example of a textile lattice material 32 made of PET that can be used in combination with a natural fiber mat or a synthetic fiber mat. In the example shown, the textile lattice material 32 has approximately circular meshes 34 with a mesh size of approximately 8 mm. In this example, the lattice material is produced by a warp knitting process. The bridge width between the meshes is 1 to 2 mm, in particular 1.2 to 1.7 mm, for example about 1.2 mm, 1.5 mm or 1.7 mm. Meshes have approximately the shape of a circle. The area weight of the textile lattice material is about 100-300 g/m², e.g., about 120 g/m², 175 g/m², 250 g/m², or 300 g/m².

Other mesh sizes and shapes are also possible, for example, mesh size in the range of about 1-15 mm, rectangular and round mesh shapes. The textile lattice material may be, for example, warp knitted, knitted, woven or produced as knitted fabric, crocheted fabric or by a similar technique. In other examples, the bridge width between the meshes is, for example, between 0.5 and 2 mm or even between 0.5 and 5 mm. For example, the mesh width may be between 0.5 and 25 mm, and in particular between 5 and 12 mm. The weight per unit area of the textile lattice material is, for example, between 30 and 500 g/m². In various examples, the weight per unit area of the composite of fiber mat and textile lattice material may be between 930 g/m² and 2100 g/m², wherein the weight of 930 g/m² may result from using a fiber mat having a weight per unit area of 900 g/m² and a textile lattice material having a weight per unit area of 30 g/m², and wherein the weight of 210 g/m² may result from using a fiber mat having a weight per unit area of 1600 g/m² and a textile lattice material having a weight per unit area of 500 g/m².

In preferred embodiments, the fiber mat 30 comprises natural fibers, for example in the form of bast fibers of kenaf, hemp, flax or jute, or a blend of such bast fibers and polyester fibers. The textile lattice material 32 comprises polyamide or polyester fibers or likewise natural fibers in the form of bast fibers of, for example, kenaf, hemp, flax or jute. The binder used is a thermosetting acrylate, which is applied in liquid form to the composite of fiber mat 30 and lattice material 32.

Bast fibers and thermoset acrylate in fiber mats are already being used successfully in series production today and have the following advantages: they have high specific stiffness, i.e. high rigidity in relation to their weight: they can have similar thermal expansion properties to the headliner with which they are combined in use; and they are easy to process, for example in terms of the equipment required and short cycle times compared with a metal frame.

Polyester and polyamide fibers are suitable for reinforcing the stiffening frame, for example, because they have good elongation at break properties and can absorb large amounts of energy without tearing. An acrylate binder, in turn, is advantageous in terms of its processing temperature, which is in the range of 160 to 210° C. and does not exceed the melting and/or decomposition temperature of the natural and synthetic fibers proposed here. The natural fibers/bast fibers can be processed at these temperatures. Thus, as described, the proposed materials and combination of materials can be used to significantly increase the energy absorption capacity of the stiffening frame without sacrificing the quality of the stiffening frame in other respects and without increasing the effort required for the manufacturing process.

In the examples described herein, the fiber mat 30 and the textile lattice material are impregnated together with a thermoset acrylate binder. Other binders may be used, as described above.

The fiber mat 30 may be produced, for example, by feeding fibers from a staple fiber supply into a mixing chamber, where the fibers are optionally treated with an anti-mold agent, for example, rinsed. In particular, fibers of different origins can be uniformly mixed together in the mixing chamber. Subsequently, the fibers are placed on a conveyor belt, for example, where optionally a weight control can be carried out in the longitudinal direction. The fibers are aligned approximately parallel, for example by carding or an airlay process. Optionally, several layers of fibers can be arranged on top of each other offset from each other, for example by 90°. The resulting fiber mat 30 may be provided on a roll as a precursor to the manufacture of the composite material. Optionally, the aligned fibers may be bonded together intrinsically, for example by mechanical, thermal or chemical bonding and/or consolidation. Processes that may be considered for this include needling, spunlacing, or thermobonding.

As shown in FIG. 5, the fiber mat 30 thus produced is fed as a precursor to a processing device, at 40, and bonded to a textile lattice material 32, at 42, by placing the textile lattice material 32 on a surface of the fiber mat 30 and bonding it thereto, for example by mechanical, thermal or chemical bonding and/or consolidation. Processes that may be considered for bonding the textile lattice material 32 and the fiber mat 30 include, for example, needling, spunlacing, or thermobonding. Pre-bonding of the directional fibers of the fiber mat 30 prior to their bonding to the textile lattice material 32 is therefore not mandatory, because this bonding (of the fibers within the fiber mat 30) can also take place just when the textile lattice material 32 and the fiber mat 30 are bonded. Subsequently, the composite of fiber mat 30 and textile lattice material 32 is impregnated, for example by immersing the entire composite in an impregnating solution, at 44. Reference is made to the above-mentioned materials for impregnation. This results in a uniform and stable composite of fiber mat 30 and textile lattice material 32.

The composite thus formed can be stored in rolls or in pieces, at 46. To make the stiffening frame, this composite material can be processed by compression molding, at 48, as described above.

What is claimed is:

1. An interior trim part for a motor vehicle having a sliding or panoramic roof, the interior trim part comprising:
   a headliner and a stiffening frame secured to the headliner and enclosing and stabilizing an opening in the headliner to enclose a sliding or panoramic window,
   wherein the stiffening frame is made of a fiber-reinforced composite material comprising a fiber mat and a textile lattice material, the textile lattice material being applied flat on a surface of the fiber mat and impregnated together therewith, wherein the textile lattice material is bonded to the fiber mat prior to impregnation.

2. The interior trim part according to claim 1, wherein the bond is a mechanical, thermal and/or chemical bond.

3. The interior trim part of claim 1, wherein the textile lattice material is formed of synthetic fibers, natural fibers or mixtures of these fibers.

4. The interior trim part of claim 3, wherein the natural fibers comprise cotton, hemp, kenaf, flax, sisal, jute, wood, or mixtures thereof.

5. The interior trim part of claim 3, wherein the synthetic fibers comprise polymer fiber material made of organic synthetic polymers.

6. The interior trim part according to claim 1, wherein the composite material is impregnated with a binder.

7. The interior trim part of claim 6, wherein the composite material of the stiffening frame comprises only the mentioned materials.

8. The interior trim part of claim 1, wherein the textile lattice material comprises meshes or a grid-like fabric having a circular, elliptical, triangular, rectangular, or other polygonal mesh geometry.

9. The interior trim part of claim 1, wherein the textile lattice material has meshes with a mesh size between 0.5 and 25 mm.

10. The interior trim part of claim 9, wherein the textile lattice material is formed with bridges between the meshes, the bridges having a width of 0.5-5 mm.

11. The interior trim part of claim 1, wherein the textile lattice material has an area weight of 30-500 g/m2.

12. The interior trim part of claim 1, wherein the stiffening frame is composed of a plurality of frame portions fused together in a compression molding process, each frame portion having a fiber mat portion with a textile lattice material on its surface.

13. The interior trim part of claim 1, wherein the stiffening frame is molded or bonded to the headliner.

14. The interior trim part of claim 1, wherein the textile lattice material is formed with bridges between the fiber mat and a textile lattice material, the bridges having a width of 0.5-5 mm.

15. The interior trim part according to claim 1, wherein the bond is created by needling, spunlace or thermobonding.

16. The interior trim part of claim 3, wherein the synthetic fibers comprise polymer fibers, glass fibers, carbon fibers, or mixtures thereof.

17. The interior trim part of claim 5, wherein the polymer fiber material made of the organic synthetic polymers comprises PET, PP or PA.

18. The interior trim part of claim 3, wherein the synthetic fibers comprise carbon, aramid or glass fibers.

19. The interior trim part according to claim 6, wherein the binder is a thermosetting binder or a thermoplastic binder.

20. The interior trim part of claim 19, wherein the thermosetting binder is epoxy, acrylate, phenol, polyurethane or unsaturated polyester, which is applied or introduced onto and/or into the fiber mat in liquid or powder form.

21. The interior trim part of claim 19, wherein the thermoplastic binder is a biopolymer or thermoplastic acrylate, which is introduced into the fiber mat in the form of thermoplastic binding fibers or in liquid form.

22. The interior trim part of claim 21, wherein the biopolymer is PLA, polyester or polyamide.

* * * * *